INVENTOR
JANUSZ GUTKOWSKI

Oct. 5, 1965  J. GUTKOWSKI  3,209,915
FILTER
Filed June 11, 1962  2 Sheets-Sheet 2
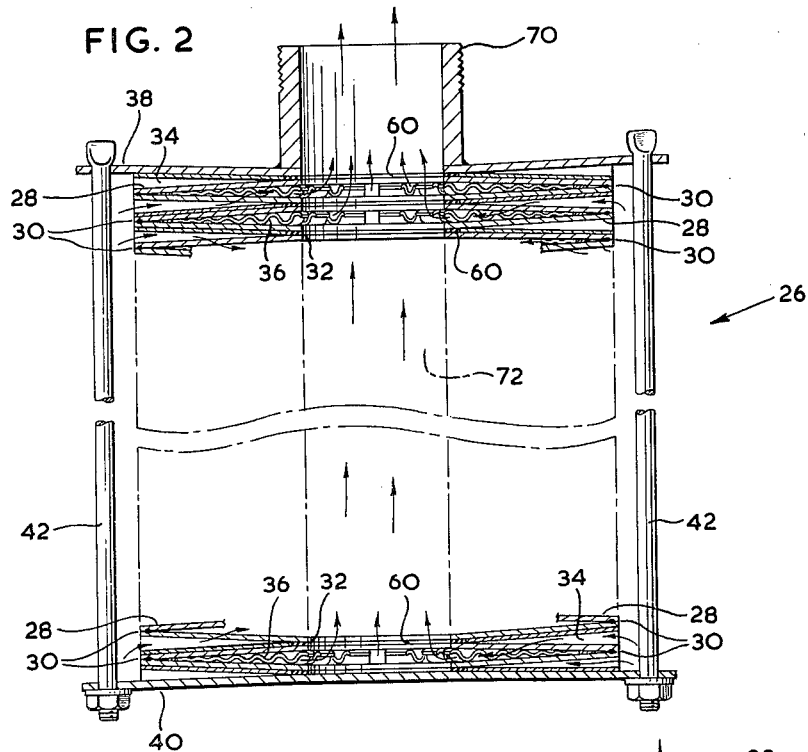
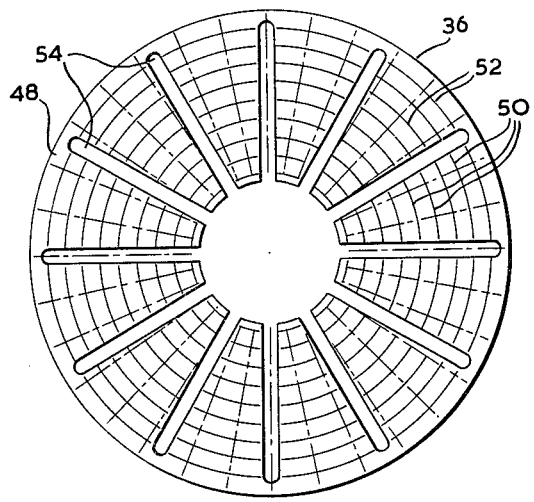
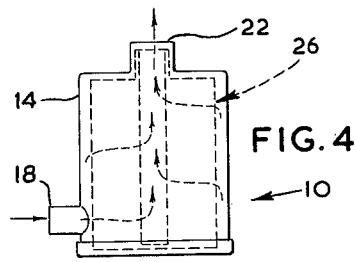
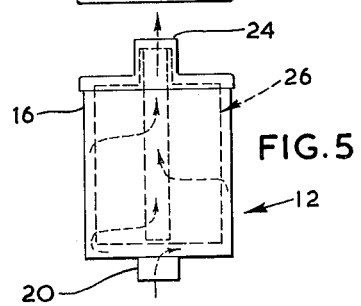
INVENTOR
JANUSZ GUTKOWSKI
BY Fetherstonhaugh & Co.
ATTORNEYS

United States Patent Office 3,209,915
Patented Oct. 5, 1965

3,209,915
FILTER
Janusz Gutkowski, Willowdale, Ontario, Canada, assignor to Aircraft Appliances and Equipment Limited, Rexdale, Ontario, Canada
Filed June 11, 1962, Ser. No. 201,644
Claims priority, application Canada, Mar. 6, 1962, 843,721
2 Claims. (Cl. 210—347)

This invention relates to a filter construction of the general type having a filter barrier comprised of a series of generally flat filter elements joined along opposed edges to dispose them in stacked arrangement. Commonly, the filter elements are of a generally annular or cylindrical shape and made from sintered, woven or felted materials of metal and mineral or organic nature. They are sealed at opposed edges to dispose them in a stacked arrangement and supported, usually on one side only but in some cases on both sides.

It is an object of this invention to provide an efficient support structure for the filter elements of a stacked type filter that gives maximum support to stress on the filter in both directions and results in minimum impedance to flow through the filter barrier.

It is a further object to provide a filter construction in which the filter elements can be made from a wide variety of brittle as well as pliable materials.

It is an additional object to provide an economical construction.

It is still a further object to provide a filter construction having parts that are not likely to shed particles into the material flowing therethrough in use.

Generally speaking, a filter of this invention is characterized by spacers having undulating surfaces comprised of crests and valleys. The spacers are disposed between adjacent filter elements to separate and support them in stacked arrangement. They are of at least two types and are alternated so that the crests of each spacer react against crests of an adjacent spacer and make therewith a substantial angle. The spacers have passage means therethrough to permit the flow of fluid between the filter elements that they separate. The invention will be clearly understood after reference to the following detailed specification read in conjunction with the drawings.

In the drawings,

FIGURE 2 is a side elevation partially in section of a filter unit according to this invention;

FIGURE 3 is a plan view of a spacer showing the disposition of an adjacent spacer that underlies it in dotted lines;

FIGURES 4 and 5 are elevations of complete filters according to this invention showing a flow path.

Figure 1:
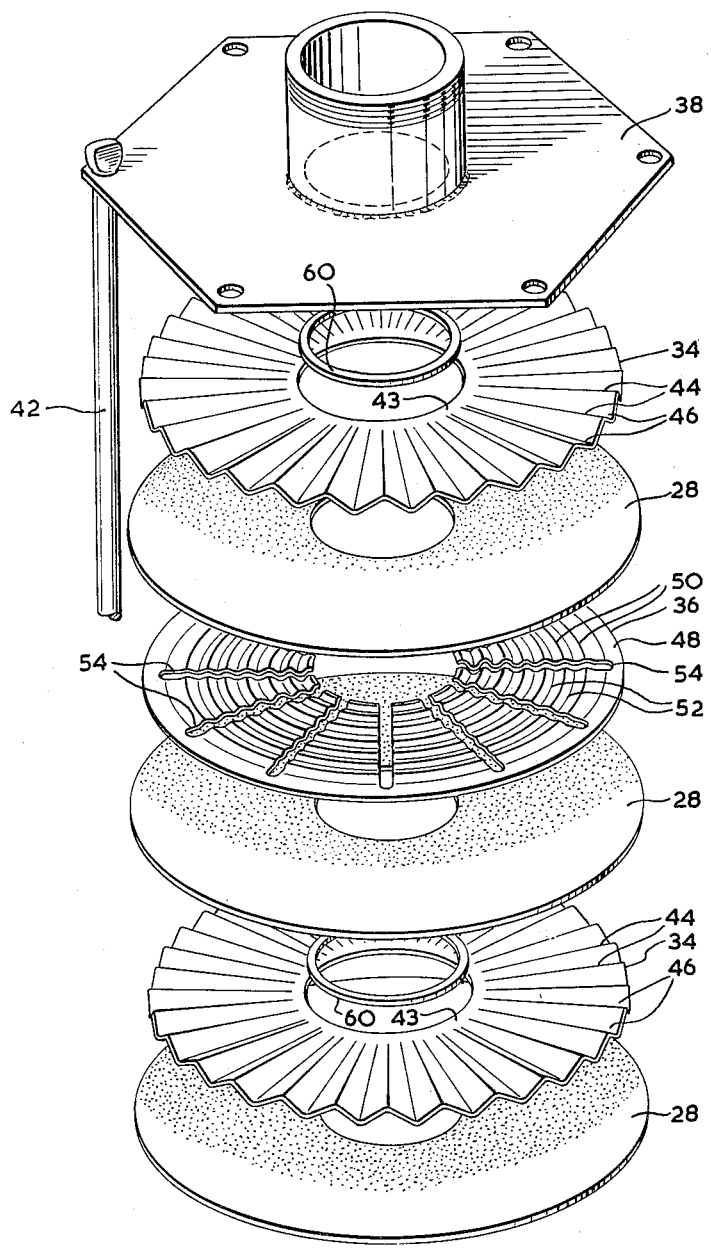
FIGURE 1 is an exploded view of filter elements and spacers used in a filter according to this invention.

Referring to the drawings, the numerals 10 and 12 generally indicate filters according to this invention. They each comprise a housing 14 and 16 respectively with inlets 18 and 20 respectively and outlets 22 and 24 respectively for the medium to be filtered. The heart of the filters is, in each case, a filtering unit generally indicated by the numeral 26.

A typical filtering unit is shown in FIGURE 2. It comprises a plurality of annular filter elements 28 made of a suitable filtering material such as sintered metal joined together at their outer edges as at 30, sealed at their inner edges as at 32, and separated by spacers 34 and 36 to dispose them in stacked arrangement. The whole is clamped together between a top plate 38 and a bottom plate 40 by means of a series of circumferentially spaced bolts 42, as will be referred to in more detail below.

The component parts of the filter unit are shown in exploded form in FIGURE 1. It will be noted that the spacers 34 and 36 are of different design. Spacers 34 are flat at their inner marginal portion 43 and have a series of undulations with crests 44 and valleys 46 that extend radially from the flat marginal portion 43 and increase in depth from the flat marginal portion to the outer edge. Spacers 36 are flat at their outer marginal portion 48 and have a series of undulations with crests 50 and valleys 52 that extend circumferentially thereof and increase in depth from the flat outer edge to the inner edge. Spacers 36 have radially extending flow paths 54 cut therein as will be referred to later.

The filtering elements 28 are joined together at their outer edges and sealed at their inner edges and separated by the spacers to dispose them in stacked arrangement, as shown in FIGURE 2. In the embodiment of the invention shown, they are made and are welded together at their outer edges as at 30. Spacers 36 are between them and increase their separation gradually to a maximum adjacent their inner edges.

Adjacent filtering elements not separated by separators 36 are sealed together at their inner edges by means of an annular resilient sealing ring 60 that is clamped into sealing engagement by the plates 38 and 40 and the bolts 42. Spacers 34 have an inner diameter just larger than the outer diameter of the sealing rings 60 and the uncompressed thickness of the sealing rings exceeds the thickness of the spacers at their inner edge whereby a good seal between adjacent filter elements in the stacked arrangement is achieved.

The construction of the filter unit will be apparent from the above description and a consideration of FIGURE 2. The filter elements and spacers are stacked as shown, and clamped between the plates 38 and 40. When so assembled, the unit is characterized by a stacked filter barrier supported on both sides by the crests of the undulations of the separator 34 and 36 that react against each other and cross each other substantially at right angles. The crossover of the crests of the inter-reacting crests of the spacers is apparent from FIGURES 2 and 3.

The predictable and efficient supporting of the filter elements by crests of undulations that are arranged to react against each other in this way results in a strong filter able to withstand fluid flow in either direction equally well; an efficient filter giving maximum usable filtering surface area in a given volume; a construction in which the filter elements are flat and can therefore be made of virtually any flat filtering material and an economical construction.

The unit of FIGURE 2 is supported into a housing, as indicated in FIGURES 4 and 5 which have inlets and outlets, the outlets of the housing coinciding with the outlet 70 of the unit. Flow is as indicated by the arrows on FIGURES 4, 5, and 2. Flow is between the undulations of spacers 34 and the filter barrier and makes use of the radially extending slots 54 of the spacers 36 to reach the space 72 defined by the inner edge of the stacked annular filter elements and spacers from which it proceeds out of the unit. Flow could be in the reverse direction to that shown.

Embodiments of this invention other than the one shown will be apparent to those skilled in the art. The filter elements could be of a different shape; the joining of the elements could be achieved differently; the undulations could be differently arranged. The essence of the invention is the supporting of the elements in an efficient flow arrangement by arranging the undulations on the spacers so that they react against each other and intersect each other efficiently. Intersection of the crests at right angles is preferred, but intersections at a substantial angle, say between 30° and 150°, would be effective.

Obviously, then, it is not intended that the scope of this invention be limited to the described embodiment.

What I claim as my invention is:

1. In a filter having a filter barrier comprised of a series of annular filter elements arranged one above the other to dispose them in a stacked arrangement, annular spacers for said filter elements, said spacers having undulating surfaces comprised of crests and valleys and being disposed between adjacent filter elements to separate and support them in said stacked arrangement, said spacers being of two types and adjacent spacers being of different types, the spacers in one of said types having their crests disposed annularly and the spacers in the other of said types having their crests disposed radially whereby said crests coincide with each other at substantially right angles, at least some of said spacers having passage means therethrough to permit the flow of fluid between said elements and through said filter barrier, the undulations of said spacers varying in depth, alternate spacers being of opposite depth variation to support said stacked arrangement, said filter elements being connected alternately at adjacent outer edges and at adjacent inner edges to dispose them in a stacked arrangement, said passage means in said spacers being in said spacers that have annular crests and comprising radially extending cut-outs to permit the flow of fluid through said barrier.

2. In a filter having a filter barrier comprised of a series of generally flat filter elements arranged one above the other to dispose them in a stacked arrangement, spacers for said filter elements, said spacers having undulating surfaces comprised of crests and valleys and being disposed between adjacent filter elements to separate and support them in said stacked arrangement, said filter elements being connected alternately at adjacent outer edges and adjacent inner edges to dispose them in a stacked arrangement, said spacers being of at least two types and adjacent spacers being of different types to the extent that the crests of adjacent spacers coincide with each other at substantially right angles and react against each other to support said filter elements, at least some of said spacers having passage means therethrough to permit the flow of fluid between said elements and through said filter barrier, the undulations of each spacer varying in depth, alternate spacers being of opposite depth variation to support said stacked arrangement.

References Cited by the Examiner

UNITED STATES PATENTS

| 2,602,548 | 7/52 | Griffiths | 210—344 |
| 2,750,047 | 6/56 | Hasbrouck | 210—492 X |
| 2,873,030 | 2/59 | Ashton | 210—492 X |

FOREIGN PATENTS

| 480,810 | 3/38 | Great Britain. |

REUBEN FRIEDMAN, *Primary Examiner.*

HARRY B. THORNTON, *Examiner.*